Figure 10:
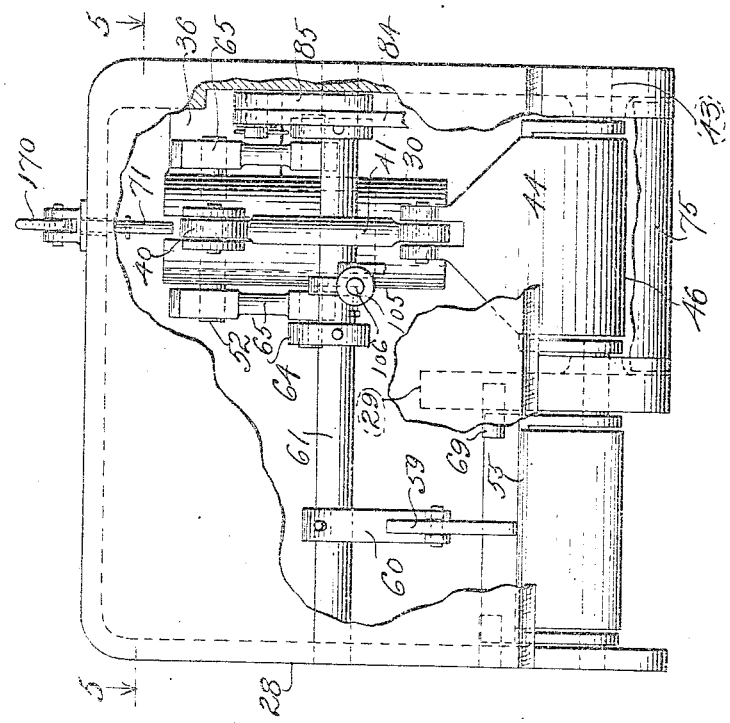

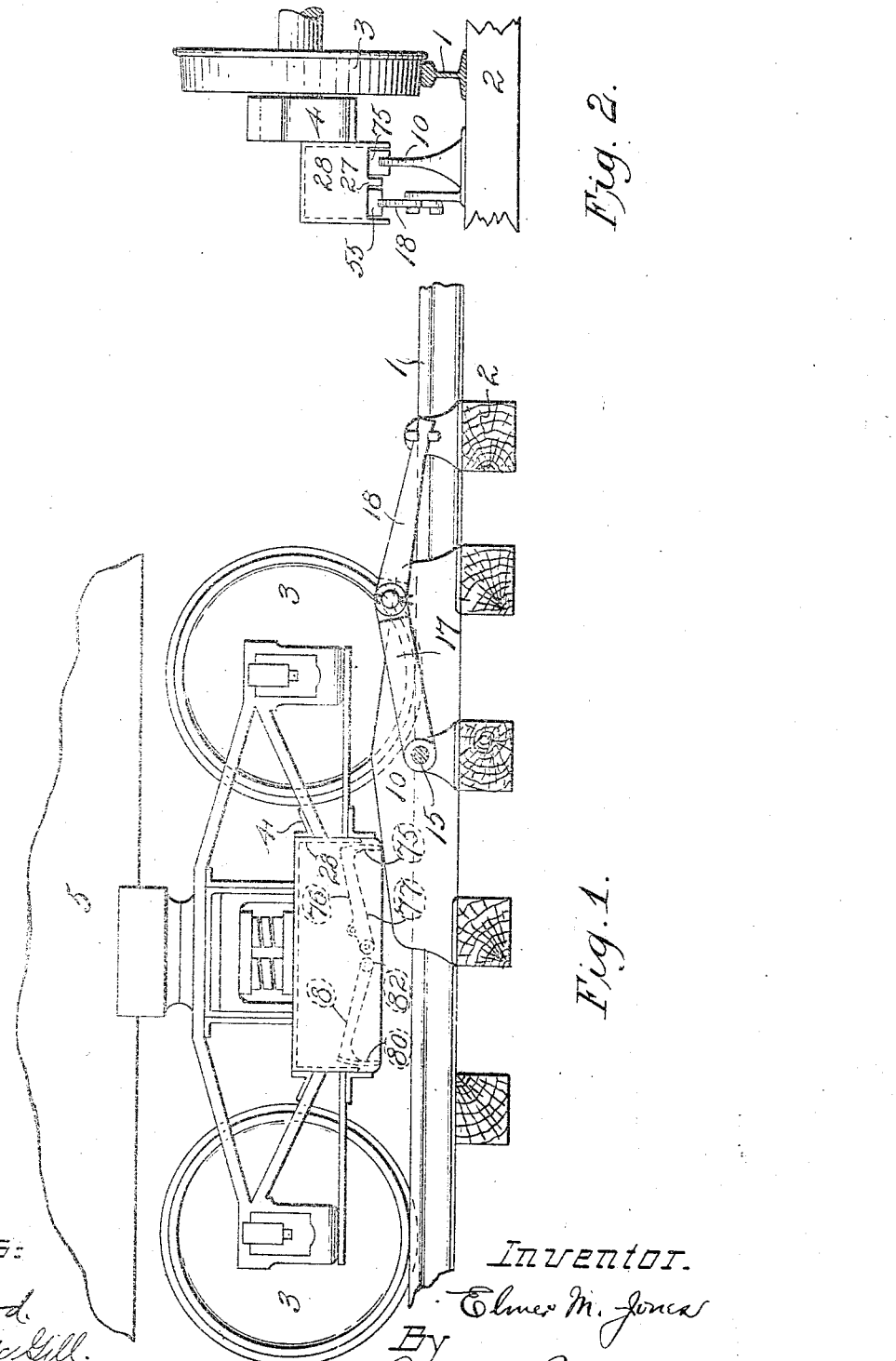

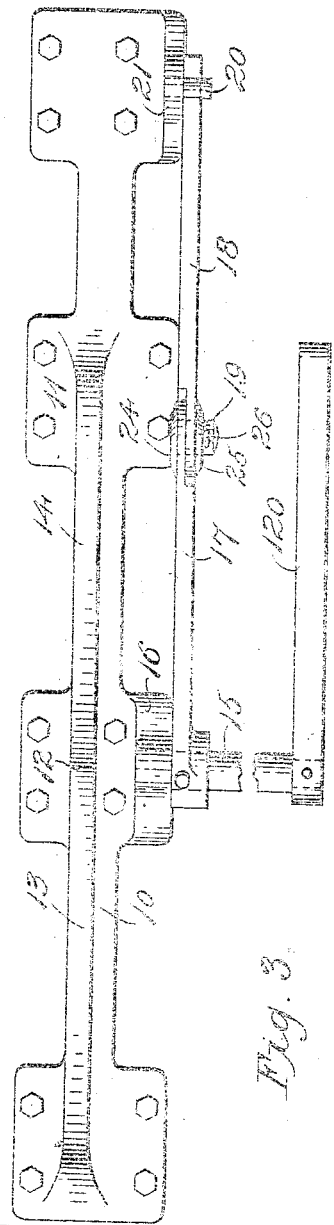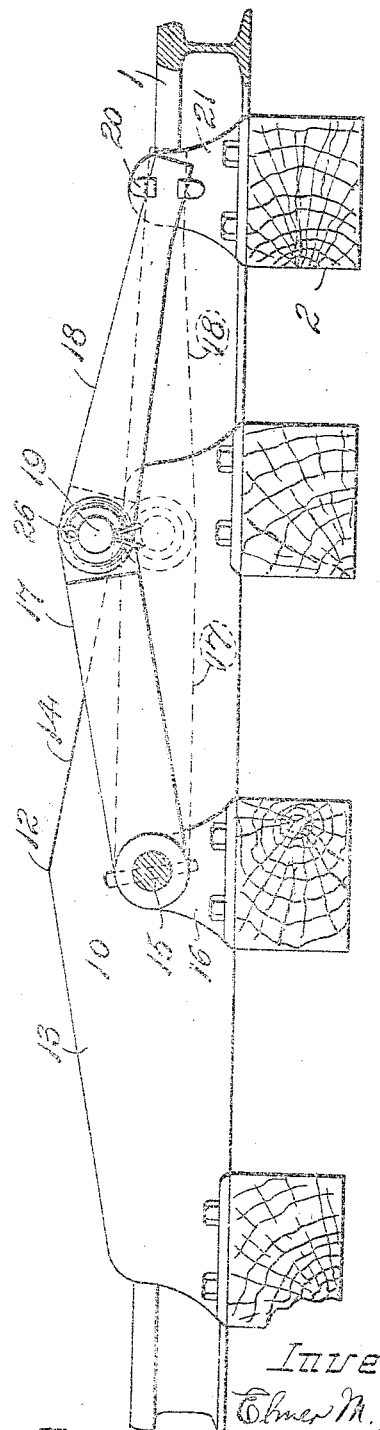

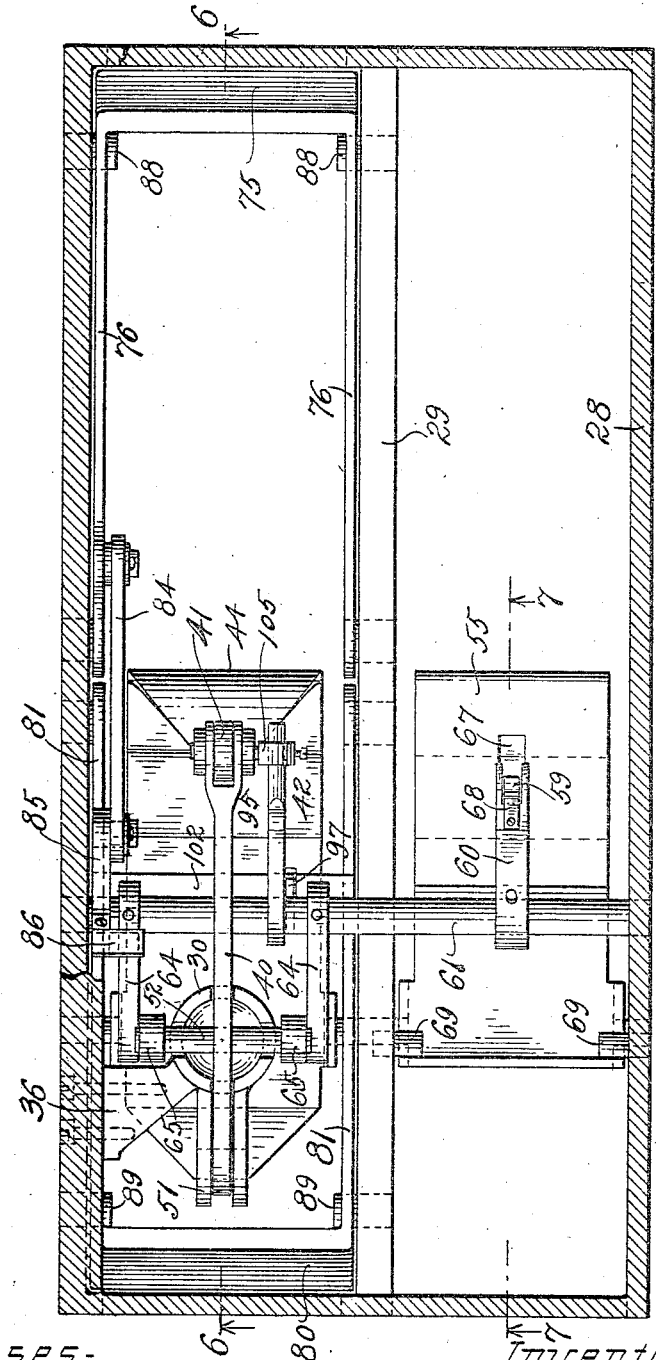

E. M. JONES.
AUTOMATIC TRAIN STOP.
APPLICATION FILED MAY 22, 1911.

1,129,201.

Patented Feb. 23, 1915.
7 SHEETS—SHEET 4.

Fig. 6.

Witnesses:
A. L. Lord.
Hugh B. McGill.

Inventor.
Elmer M. Jones,
BY Albert H. Bates,
Att'y.

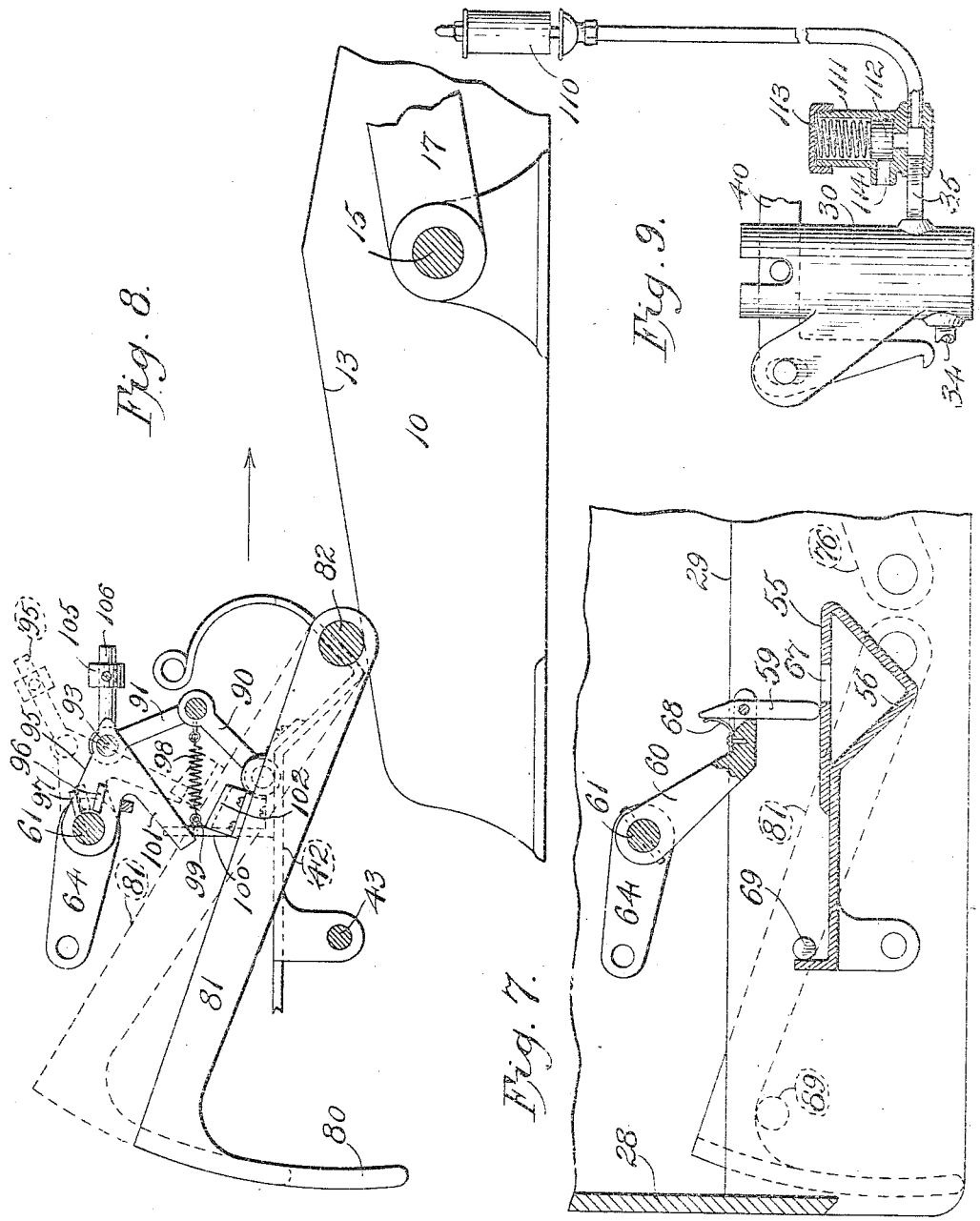

E. M. JONES.
AUTOMATIC TRAIN STOP.
APPLICATION FILED MAY 22, 1911.

1,129,201.

Patented Feb. 23, 1915
7 SHEETS—SHEET 6.

Witnesses:
A. L. Lord.
Hugh B. McGill

Inventor.
Elmer M. Jones,
By Albert N. Bates,
Atty.

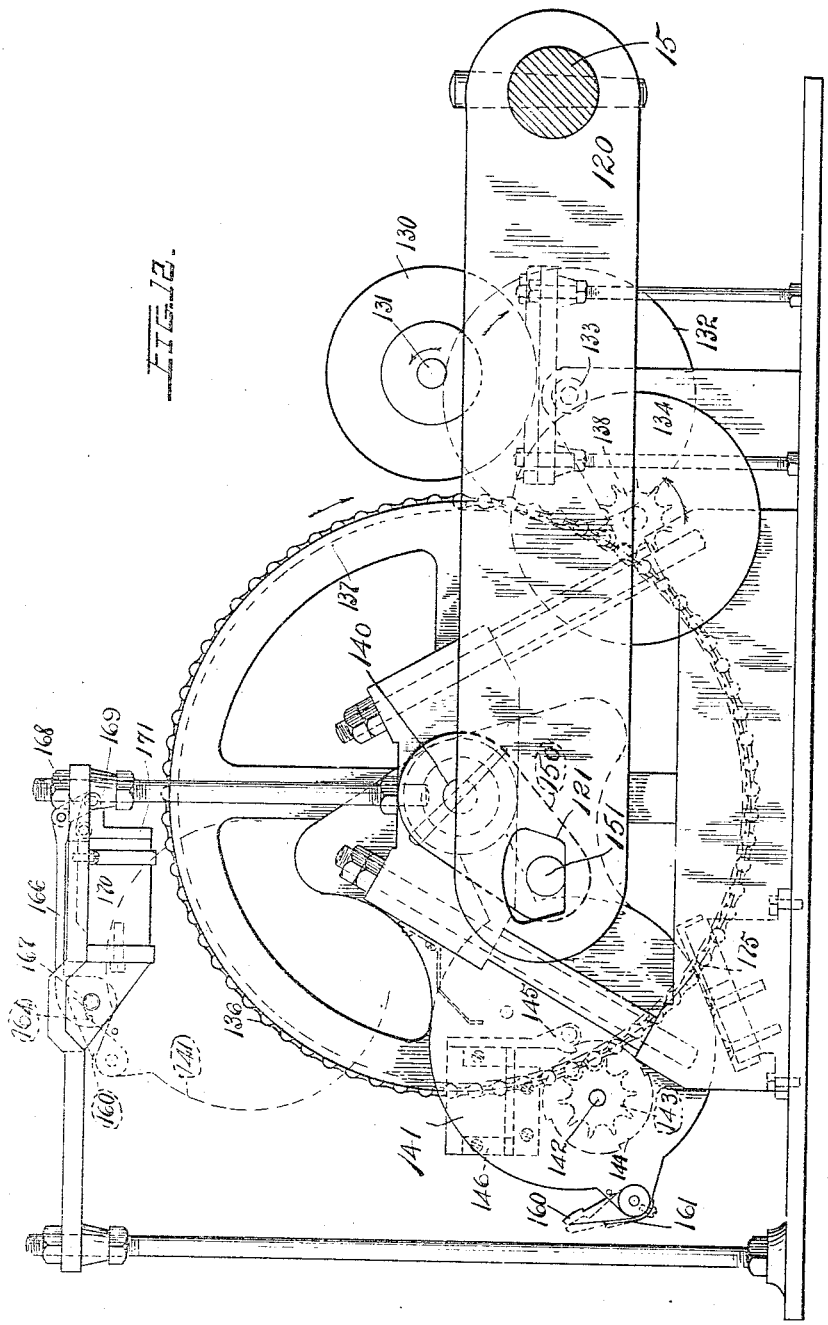

UNITED STATES PATENT OFFICE.

ELMER M. JONES, OF ATLANTA, GEORGIA, ASSIGNOR TO JONES SIGNAL SYSTEM COMPANY, OF ATLANTA, GEORGIA, A CORPORATION OF GEORGIA.

AUTOMATIC TRAIN-STOP.

1,129,201.

Specification of Letters Patent.   Patented Feb. 23, 1915.

Application filed May 22, 1911.   Serial No. 628,88.

*To all whom it may concern:*

Be it known that I, ELMER M. JONES, a citizen of the United States, residing at Atlanta, in the county of Fulton and State of Georgia, have invented a certain new and useful Improvement in Automatic Train-Stops, of which the following is a full, clear, and exact description, reference being had to the accompanying drawings.

Broadly speaking, the object of this invention is to provide an effective system for automatically giving a controlling indication on a moving vehicle from a position independent of the vehicle.

More particularly, the present invention has for its object the provision of such mechanism so designed that any failure of the movable parts to act will insure the giving of a danger indication. Such danger indication may consist of the automatic application of brakes or the giving of a suitable signal notifying the operator of the vehicle to apply the brakes. I use the term "indication" herein as including any such controlling agency on the vehicle, whether the operation is entirely automatic or partly mental and partly manual—the ultimate object being the same in each case, namely, the stopping or controlling of the vehicle whenever danger is indicated.

In accomplishing the objects stated, I provide stationary mechanism along the trackway adapted to coöperate with movable mechanism on the vehicle, when they come into juxtaposition, to start the operation of mechanism which is adapted automatically to give a danger indication (either a brake or a signal actuation, as above explained), and I provide controllable movable mechanism for determining whether such started operation shall be allowed to become complete or shall be interrupted so as to be noneffective.

Another feature of the present invention is the arrangement of the parts so that on a backward movement past the track device the latter is non-effective, by reason of an automatic invariable resetting of the danger indication initiated by the track device.

Another feature of the present invention is that the electric current operates to hold the resetting mechanism in active position against some force tending to displace it therefrom, whereby any failure of the current renders the resetting mechanism non-effective, so that the initiating device completes its work, giving the danger indication.

Another feature is the arrangement of the movable parts of the track mechanism so that they tend to return by gravity to inoperative position, whereby, on any failure of any mechanism which may temporarily hold such parts in active (*i. e.* safety) position, they will automatically return to danger position.

Another feature of the present invention is a governing device which automatically and invariably resets for slow speed the danger indication initiated by the track device. In accomplishing this I provide a governor having the characteristic that certain of the moving parts are operable by a yieldingly connected driver, whereby, for high speeds, the inertia of such parts prevents their immediate movement and the driver therefor is moved idly in opposition to a spring or yielding device, while for slow speeds, the spring does not yield, and the driver is effective in moving parts which accomplish resetting. I believe this type of governor, combined with a vehicle indicating device, is broadly new with me.

Another feature of the present invention is the arrangement of a cab signal to operate whenever a ground device is passed, irrespective of whether such device is in condition to give a danger or safety indication. By this means the engineer is periodically advised of his exact location with reference to the ground devices.

Other features of the invention contributing to the efficiency of the operation, or to simplicity of construction, are included within this invention and will be hereinafter more fully explained.

Figure 11:
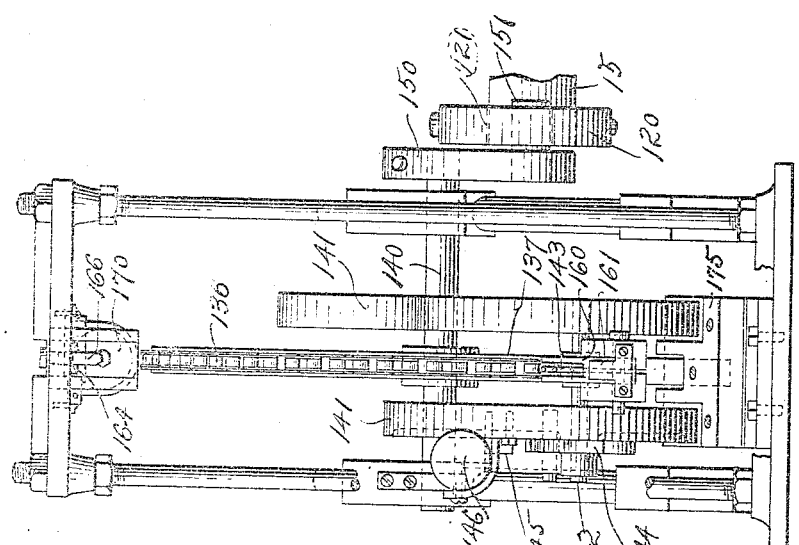

In the drawings, Figure 1 is a side elevation of my ground device and coöperating vehicle equipment shown as mounted on the truck of some vehicle, as, for example, the locomotive tender; Fig. 2 is an end view of the ground device and the coöperating vehicle equipment, this view showing a portion of the truck and one of the wheels of the vehicle; Fig. 3 is a plan of the ground mechanism; Fig. 4 is a side elevation thereof with the operating arm (shown in Fig. 3) omitted for clearness of illustration; Fig. 5 is a sectional plan of the vehicle equipment, being a horizontal section through the box shown in Figs. 1 and 2, as mounted on the outer side of the truck; Fig. 6 is a vertical section through such vehicle equipment on a plane indicated by line 6—6 of Fig. 5; Fig. 7 is a vertical section through such equipment substantially as indicated by the line 7—7 of Fig. 5; Fig. 8 is a side elevation of a portion of the mechanism shown in Fig. 6, but equipped with my governing device; Fig. 9 is a view of an air whistle and its connection with the controlling valve of my brake-applying mechanism; Fig. 10 is an end view, partly broken away of the vehicle equipment; Fig. 11 is an end view of the electromagnetic mechanism which operates the movable parts of the ground device; Fig. 12 is a side elevation of this latter mechanism.

Referring first to Figs. 1 to 4 inclusive, the numeral 1 represents a railway rail supported on the usual ties 2. 3 indicates the vehicle wheels which are shown as mounted on a suitable truck 4 supporting a body 5. Located on the outer side of the rail and extending parallel with it is a stationary ramp 10. This ramp is shown as a comparatively narrow upright web provided with foot plates 11 by which it is bolted or spiked securely to the ties. The upper surface of the ramp is inclined downwardly in opposite directions from a mid point indicated by 12. As shown in the drawings, there is a very gradually upward inclined face 13 or 14 leading from opposite directions to the mid point. These faces coöperate with vehicle mechanism to be hereinafter described, which operate to initiate the danger indication, the completion of such indication depending on other conditions. It will be seen that the ramp is a substantial stationary device with nothing about it to get out of order or become displaced. In fact, if desired, it could be made a part of the rail or could have its foot plates extended beneath the rail and secured thereto. Suitably journaled on the outer side of the ramp and transversely of it is a rock shaft 15. This rock shaft is shown as having a bearing in a pedestal 16 formed on one of the ramp feet 11 or it may have its bearing in the ramp wall itself, or entirely independently of the ramp. Rigid on this rock shaft 15 is an arm 17, which has a knuckle joint with a bar 18 by means of a pin 19. The arm 18 is guided at its other end between overhanging pins or lugs 20 on a bracket 21, which is shown as rising from one of the ramp foot plates. The overlapping arms 17 and 18 at their joints are preferably mutually offset or reduced, as shown in Fig. 3, so that the bodies of the arms aline. The pin 19 is shown as having a large head 24 on one side of these arms, while on the other side of the opposite arm it is surrounded by a washer 25 held by a cotter pin 26. Suitable means to be hereinafter described are provided for rocking the shaft 15 and thereby raising the arms 17 and 18 from the normal position shown in dotted lines in Fig. 4 into the position shown in full lines. In this latter position these two arms provide a double acting ramp which is adapted to coöperate with other means on the moving vehicle to reset or nullify the danger indication initiated by the stationary ramp 10.

It will be seen from the above construction that whenever the vehicle passes over the stationary ramp, the danger indication is initiated thereby, but whether this initiation becomes effective depends (when the vehicle is moving forward) upon what happens to a resetting mechanism which travels over the movable ramp. If the movable arm 17 is up (as in full lines in Fig. 4) the danger initiation is counteracted before it becomes effective. When the arm is down the danger initiation completes itself and applies the brake, or gives a signal, or both. For a backward movement of the vehicle, the ramp incline 14 would initiate a danger indication, but this is always counteracted by means on the locomotive to be hereinafter described. I will first describe the mechanism on the moving vehicle by which the stationary ramp surface 13 initiates the application of the brake. Then I will take up the mechanism by which the movable ramp surface 17 may reseat such brake-applying mechanism. Both of these mechanisms are carried within a box 28 shown in Figs. 1 and 2, as carried by the vehicle truck and having a top, sides and ends and an open bottom. In its lower portion the box is divided by a vertical, longitudinal web 29 and the sides of the box and web carry the applying and reseating mechanisms mentioned.

Referring to Figs. 5, 6 and 10, 30 indicates a valve casing, (shown as held to the box wall by a boss 36) 31 a valve plug seating therein, 32 a spring bearing on the plug, and 33 a head bearing on the spring. 34 indicates a branch of the train pipe which enters the valve casing below the plug, and 35 an exit pipe from the casing above the plug. When the plug is seated, the exit from the pipe 34 is accordingly cut off, while, when the plug is allowed to rise, an exit is provided through the pipe 35. The plug is normally held to its seat by a bar 40 resting thereon and connected at one end by a link 41 with an end of the lever 42 pivoted at 43. The other end of this lever has an overhanging latch or shoulder 47 which engages a latch or nose on a downward extending portion 48 of the bar 40. The bar 40 is prevented from undesirable displacement by having a slot 49 extending around a pin 50 carried by arms or ears 51 on the valve casing. It will be seen that this construction enables the bar 40 to normally hold the plug on its seat. Where the lever 42 connects with the link 41 it is formed in the curve shown at 44 and in the upwardly inclined portion 45, thus presenting a downwardly projecting nose at 46. This lever is so positioned that this nose engages and rides up on the ramp surface 13 and in doing so, swings the latch 47 free from the bar 40, releasing the valve plug so that the air may escape from the pipe 34, whereby the brake may be applied. The peculiar form of the lever 42 and the bar 40 and their connection is designed so that any breakage or distortion of any of these parts will automatically release the valve. This construction and feature of operation is shown and claimed in my patent No. 1,109,679, filed March 16, 1911. In the present invention, when track conditions indicate safety, I intend that the valve 31 opened by the ramp and lever 42 shall be reset before there is time for the application of the brake. This is accomplished by mechanism which I will now describe.

Mounted alongside of the initiating lever 42, in the other compartment of the box 28, is a lever 55 of the form shown more particularly in Fig. 7. This lever has a down-turned nose 56 which is in position to ride up on the elevated resetting arm 17 of the ground device, and in doing so, abut against the under side of a dog 59 on a rock arm 60. This arm is pinned on a rock shaft 61, secured to which are a pair of arms 64, in the other compartment of the box, which are connected with a pair of links 65, which yoke loosely around a pin 52 projecting from the bar 40. Accordingly, when the nose 56 rides up on the arm 17, the bar 40 is drawn downwardly to reset the arms which were released by the lever 42 on the ramp 13. Accordingly, whenever the arm 17 is elevated, the danger indication (that is the starting of the application of the brake) is counteracted before it has proceeded to an effective extent by reason of the resetting of the valve. When the arm 17 is down in the position shown in dotted lines in Fig. 4, it is ineffective to reset the valve, and hence the air vent is continued open and the brake goes on automatically, or such other danger application is effected as is desired to be accomplished by the escape of air from the pipe 34. It will be seen that the links 65 are slotted where they pass around the pin 52, so that they do not normally interfere with the upward movement of the bar 40 and the valve plug in releasing the air. It will also be noticed that, in the upper portion of the lever 55, in front of the dog 59, is an opening 67. The purpose of this is to prevent any jamming of the parts, due to excessive raising of the lever 55. This results because, as that lever reaches its proper height, the dog 59 passes into the opening 67, so that any further movement of the lever 55 is idle. The spring 68 bearing against the dog, as shown in Fig. 7, leaves the latter free to swing in one direction, preventing its binding on the edge of opening 67. A suitable pin 69 limits the downward movement of the lever 55.

In order to prevent the engineer from throwing off the brake actually applied, I provide a hand device at the box 28 which is adapted to reset the valve. Accordingly, it is necessary for the train to come to a stop, or so near a stop that the engineer can dismount and, from the ground, operate this hand reset before the brake can be thrown off. This resetting device is shown in Fig. 6 as consisting of the lever 70 carried on the box 28 and connected with a plunger 71 guided to bear on the upper edge of the bar 40 and adapted to force the bar down when it has been elevated. A spring 72 surrounding the rod 71 normally maintains the lever 70 in elevated position, as shown in this figure.

To protect the lever 42 from inadvertent operation by some obstruction on the trackway I provide a pair of segmental gates 75 and 80 which lie at the opposite ends of the compartment occupied by the lever 42. The gate 75 has a pair of arms 76 which are pivoted to a side wall of the box and the intermediate partition at 77. The gate 80 has similar arms 81 and similar pivots 82. These gates normally stand as shown in Fig. 6 in front of and behind the lever 42 and are adapted to ward off obstructions. At the same time, they may move upwardly on their pivots to idle position, and do so move when the edges of the gates engage the surface of the ramp 10. Suitable pins 88 and 89 limit the downward movement of the gates. Each of these gates performs another function which will be hereinafter described.

The additional function performed by the gate 75 is to reset the valve automatically and invariably on the backward movement of the vehicle when it passes over the ramp 10. Such backward movement releases the valve the same as the forward movement, but before this release can become effective the gate 75 riding upwardly on the ramp surface 14 shoves on the link 84, connected with one of the arms 76, which rocks the arm 85, which is loose on the rock shaft 61. This arm, however, has a projection 86 which overhangs one of the rock arms 64 and hence is adapted to rock the shaft when the arm is swung in that direction, thereby swinging downwardly the arms 64 and resetting the valve by means of the links 65 and the pin 52. Accordingly, backward movement of the vehicle cannot cause an application of the brake.

It is frequently desirable to provide mechanism whereby, in forward running at slow speed, the vehicle may still be allowed to pass over the raised arms 17 without applying the brake. This permissive running past a danger signal is desirable in enabling an engineer to enter a block to remove a car or other obstruction therein, or to advance under flag in case of emergency. For example, the determining point of speed may be five miles per hour, and it is then desirable that there be a suitable governor preventing the application of the brake under danger conditions where the speed is less than five miles an hour, while insuring the application where it is greater than five miles an hour. In accomplishing this permissive control, I provide a very simple form of governor which operates on the principle of the inertia of certain resetting parts opposing their movement by a yieldingly connected driver. These resetting parts are so adjusted that, for high speed their inertia prevents the driver actuating them, the spring yielding instead; while for speeds less than the critical speed, the inertia is small enough so that the spring will not yield materially and the driver will be effective to move the resetting parts. This governor is shown particularly in Fig. 8. It includes some of the parts shown in Fig. 6 and there omitted for clearness of illustration.

Referring now particularly to Fig. 8, 90 and 91 indicate a pair of connected toggle links, the lower one of which is hinged at its lower end to the brake applying lever 42. The upper arm 91 is hinged at 93 to an arm 95 which is loose on the shaft 61 but carries a lug 96 adapted to coöperate with the pin 97 on the shaft. A tension spring 98 is stretched between the knuckle of the toggle and an adjustable anchorage 99 on a bracket 100 carried by the arm 42. Now, when the lever 42 is raised by engagement with the ramp surface 13, if the speed is above, say, five miles an hour, such movement will be quick enough so that the spring 98 will be stretched rather than the arm 95 raised, owing to the inertia of such arm and the connecting mechanism. If, however, the speed is less than such critical amount, the raising of the lever 42 raises the toggle links without buckling them, which raises the arm 95 into the position shown in dotted lines in Fig. 8. Thus, the toggle links constitute a yielding driver for the arm 95. When they have raised that arm a projection 101 thereon stands over a bracket 102 carried on the arms 81 of the gate 80, so that, as that gate is raised by trailing over the ramp 13, the bracket 102 shoves upwardly on the arm 101 and thereby, by reason of the lug 96 and pin 97, rocks the shaft 61, thus resetting the valve.

The inertia of the moving parts may be varied by adjusting the weight 105 on the projection 106 of the arm 95. The spring may be adjusted by turning the eye 99. When these factors bear the proper relation to each other, only speeds less than the critical speed results in raising the arm 95 to cause the resetting of the valve, while those greater than the critical speed cause the toggle arms to buckle, whereby no resetting is effected. It is to be seen that, if the spring should break or become weakened, it would simply result in the brake being invariably applied in danger conditions, or applied at a lower speed than the critical permissive speed.

Summarizing the operation, it will be seen that the application of the brake is started whenever the vehicle passes the stationary ramp, irrespective of the direction; that it is also started if any accident happens to the brake-applying mechanism or if it engages any obstruction. When this actuation has been initiated, it is rendered non-effective only under safety conditions. That is to say, first, when the ramp arm 17 has been set in safety position, by hand or automatically; second, when the vehicle is running less than a given permissive speed, and third, when the vehicle is running backward. The resetting in any of these instances requires the moving parts being in proper working condition, and, if any of them are disturbed or broken or jammed, the initiated application of the brake continues, resulting in the stopping of the vehicle. This feature of invariably initiating the application of the brake, and under proper conditions only preventing such initiation becoming effective, is one of the vital features of the present invention.

It is convenient to give in the vehicle an audible signal whenever the vehicle passes over a ramp, as well as when the brake is applied. I accomplish this very simply by connecting the exit pipe 35 of the valve with a suitable whistle. This is indicated in Fig. 9, where the pipe 35 is shown as continued to an air whistle 110 in the vehicle or cab. Every time the vehicle passes over a ramp 11 the escape of air from the pipe 34 into the pipe 35, though normally insufficient to apply the brake, is sufficient to give a short audible sound at the whistle. When the valve is not at once reset and the brake is being actually applied, this diminutive, short signal becomes a strong blast through the whistle. To prevent any intentional or accidental clogging of the whistle openings interfering with the brake, I provide a small cylinder 111 normally connected with the pipe 35 and having a piston 112 normally held by a spring 113 to close an opening 114. Ordinarily, this device is idle. If, however, the air released from the pipe 34 should not find a ready exit through the whistle, it raises the plunger 112 and escapes through the opening 114 uncovered thereby.

As heretofore referred to, the resetting arms 17 and 18 may be raised manually by the rocking of the shaft 15. To render the stop automatic, however, it is desirable that mechanism be provided for rocking this shaft automatically only under safety conditions. The mechanism I have provided for that purpose is similar in many respects to the mechanism shown, described and claimed in my prior applications Nos. 561,067 and 605,207, filed May 13th, 1910, and January 18th, 1911, respectively. It is shown herein in Figs. 11 and 12 and will now be particularly described.

On the rock shaft 15 I mount a heavy arm 120 (Fig. 3) rigidly secured to the shaft and projecting in the same direction as the arm 17. This arm 120 is located a suitable distance at the side of the track (as indicated by the break in the shaft 15 in Fig. 3) and is a portion of the operating mechanism shown in Figs. 11 and 12.

As shown in Figs. 11 and 12, 130 indicates a motor, the armature shaft 131 of which has a pinion meshing with the gear 132 which carries a pinion 133 meshing with the gear 134, on the shaft of which is a sprocket pinion 138 meshing with a suitable sprocket chain 136, which is on the periphery of a wheel 137. The chain is preferably loose on the periphery of its wheel, seating in a groove therein, and the wheel is itself loose on a shaft 140. Rigid on this shaft are a pair of arms 141, which carry a shaft 142, on which is a sprocket pinion 143 meshing with the sprocket chain. On this shaft 142 is a notched disk 144 with which coöperates a latch 145 which is a portion of the armature of a magnet 146 carried by one of the arms 141. Rigid on the shaft 140 is a crank arm 150 which has a crank pin 151 occupying a slot or opening 121 in the arm 120. Now, when the magnet 146 is energized, its armature prevents the rotation of the disk 144 and shaft 142, thereby locking the pinion 143 to the sprocket chain 136, so that, if the motor 130 be rotated at such time, the sprocket chain driven thereby lifts the arms 141 and thereby turns the rock shaft 140, which by reason of the crank, raises the arm 120, thereby raising correspondingly the arms 17 and 18, making the resetting ramp. Accordingly, whether the rotation of the motor is effective to raise the arms 17 and 18 depends on the electric condition in the electro-magnetic latch 146. Carried by the arms 141 near their extreme ends is a latch 160 pressed by a spring 161. When the arms 141 have been raised to their highest point, as shown in dotted lines in Fig. 12, the latch 160 passes over and engages a pin 164 on an arm 166 pivoted at 167 and at its other end connected by a link 168 with a bell crank 169. The other arm of this bell crank forms the armature 171 of the electromagnet 170. This magnet normally holds the armature and, by reason of it, the arm 166 and pin 164 stationary, so that the latch 160 hooks over this pin when the arms 141 come into their highest position, holding them in such position. The electro-magnetic latch last described, it will be seen, may hold the mechanism in position with the arms 17 and 18 raised to operate the resetting mechanism on the vehicle. When the current through the magnet 170 ceases, the weight of the arms 141 (which are quite heavy) on the pin 164, pulls that pin downward around the axis 167 (the armature having lost its hold) sufficient to free the latch 160 so that the arms 140 drop by gravity, coming to a stop when they strike the stationary abutment 175. In order to give the motor a chance to speed up before the load is thrown thereon in elevating the arm 120 and the arms 17 and 18, as well as to give a blow movement on the arm 120 in starting, I provide considerable clearance between the crank pin 151 and the opening 121 in the arm 120. This blow is effective, both on raising the arm and on lowering it, and immediately overcomes any sticking action, if there should be any, in the various arms or the rock shaft 15. For example, if there should be snow or ice on the arms 17 and 18, or the joint 19, or around the bearings of the rock shaft 15, the blow effectively breaks the same. These parts are preferably so arranged that very little snow or ice could clog upon them, and the force of the motor may easily be sufficient to dislodge the same.

Any suitable system of circuits for operating the motor and the magnetic latches 146 and 170 may be employed. I find it convenient, however, to put the two magnets and the motor all on parallel branches of a circuit passing through a battery and an armature of a controlling magnet. As a portion of the branch circuits through the motor and the magnet 146, I place a switch (not shown) which is automatically opened by an extreme elevation of the arms 141. Now, with such a system of circuits, the energization of the said controlling magnet sends current through the motor and the two magnets 146 and 170. Accordingly, the arms 141 are latched to the sprocket chain and the motor drives that sprocket chain and elevates the arms until the latch 160 engages the pin 164 and is held by the magnet 170. As this position is reached, the switch opens and the motor and magnet 146 become deënergized. Accordingly, the arms are held in their elevated position only by the magnet 170. Whenever the current through this magnet ceases, either by the opening of the controlling circuit or the loss of battery power therein, or the breaking of the local circuit, or loss of its battery power, the arms drop from their own weight, and the resetting arms 17 and 18 are returned to idle position, thus leaving the whole device at danger. It will be seen, therefore, that any failure of the current, from whatever cause, insures the device being at danger.

I desire to emphasize the fact that, in this invention, the ground device is normally in the danger position and must remain so unless the parts are in proper working order and are intentionally held at safety. If snow or ice should accumulate on the resetting arms or their operating mechanism, sufficiently to prevent their operation, or if their operation be prevented by any cause whatsoever, it would simply result in the brake being applied perhaps unnecessarily. Should the circuits be out of working order for any cause the motor will not raise the resetting arms, or, if there is any failure after they are raised, they immediately fall by gravity to danger position. Any breakage, distortion or removal of any of the moving parts of the ground equipment would also result simply in the application of the brake perhaps unnecessarily. The stationary ramp which initiates the application of the brake may be made so strong, stiff and permanent that it is as effective against the displacement or removal as the rails themselves. When this ground device is combined with a vehicle equipment arranged as here shown so that the removal, breakage, or distortion of any of the brake-applying parts will automatically apply the brake, there is provided a most effective and thoroughly protected automatic stop and signal system conforming to the most rigid requirements.

Having thus described my invention, what I claim is:—

1. The combination, with means on a vehicle for initiating a danger indication, and means on the vehicle for counteracting such initiation, a stationary member along the path of travel for operating the first mentioned means, and a movable member adapted to engage and operate the second mentioned means.

2. The combination, with means on a vehicle for initiating a danger indication, and means on the vehicle for counteracting such initiation before becoming effective, a stationary member along the trackway for operating the first mentioned means, and an adjacent movable member along the trackway adapted to be positioned to engage the second mentioned means and operate it.

3. The combination, with means on a vehicle for initiating an indication, means on the vehicle for counteracting such initiation before it becomes effective, and two actuating members adjacent to each other and located in position to respectively engage the two means as the vehicle moves past said members.

4. The combination, with means on a vehicle for initiating an indication, means on the vehicle for counteracting such initiation before it becomes effective, and two members adjacent to each other and located in pairs at intervals along the path of travel in position to respectively engage with the two means successively as the vehicle moves past said members.

5. The combination, with a movable vehicle, of means thereon for initiating the application of a brake, and means thereon for preventing such application, of two members located adjacent to each other along the path of travel and adapted to engage and operate said means respectively.

6. The combination, with a movable vehicle, of means thereon for initiating the application of a brake, and means thereon for counteracting such initiation, of two members located adjacent to each other along the path of travel and adapted to engage with said means respectively, the first member being stationary in active position and the second member being movable into and out of active position.

7. The combination, with means on a vehicle for initiating an indication, means on the vehicle for counteracting such initiation before it becomes effective, and two members adjacent to each other and located in position to respectively engage the two means as the vehicle moves past said members, the first mentioned member being stationary and the second member movable into and out of active position.

8. The combination, with means on a vehicle for initiating an indication, means on the vehicle for counteracting such initiation before it becomes effective, and pairs of members located at intervals along the path of travel in position to respectively and successively engage the two means as the vehicle moves past said members, the first acting member being stationary and the second acting member movable into and out of active position.

9. The combination, with a movable vehicle, of means located at intervals along the trackway, mechanism on the vehicle adapted to engage the same and be operated thereby to initiate the application of a brake whenever the vehicle moves forwardly past such means, and adjacent movable mechanism and means on the locomotive engaged thereby for automatically preventing such initiation becoming effective.

10. The combination of mechanism on a vehicle adapted to initiate the application of a brake, mechanism on the vehicle for interrupting such initiation before it becomes effective, and two adjacent devices along the path of travel one of which is movable and which are adapted to be engaged by and operate the respective mechanisms.

11. The combination of mechanism on a vehicle adapted to initiate the application of a brake, mechanism on the vehicle for preventing such initiation becoming effective, and two adjacent successively acting ramps along the trackway adapted to be engaged by and operate the respective mechanism.

12. The combination of mechanism on a vehicle adapted to initiate the application of a brake, mechanism on the vehicle for preventing such initiation becoming effective, and two adjacent ramps along the trackway adapted to be engaged by and operate the respective mechanisms, the first mentioned ramp being stationary and the second movable into and out of active position.

13. The combination of mechanism on a vehicle adapted to initiate the application of a brake, mechanism on the vehicle for interrupting such initiation before it becomes effective, and two adjacent ramps located in pairs at intervals along the trackway and adapted to be engaged by and operate the respective mechanisms, the first brake-applying ramp being stationary and acting first and the counteracting ramp being movable into and out of an active position when it acts shortly after the first mentioned ramp.

14. The combination, with an air valve on a vehicle, of means on the vehicle for opening such valve, other means on the vehicle for closing the valve, and two actuating means for the respective vehicle means, one of said actuating means being movable into and out of active position and the two being located adjacent to each other and in proper relation to the trackway to be engaged by the vehicle means.

15. The combination, with an air valve on a vehicle for controlling a brake pipe, two means on the vehicle for respectively opening and closing such valve, and pairs of actuating means located at intervals along the trackway and adapted to engage and actuate the respective vehicle means, the first acting member of each pair being stationary and operating to open the valve and the second acting member being movable into and out of position where it may actuate the means to close the valve.

16. The combination with means on a vehicle for actuating a controlling agency and means for preventing such actuation becoming effective, of means along the trackway for co-acting with both of the vehicle means including a controllable track fixture for actuating the preventing means.

17. The combination, with means on a vehicle for releasing air, means for shutting off such release, and pairs of members located along the trackway for actuating the two mechanisms mentioned, the members of each pair being adjacent to each other and the one first encountered actuating the first mentioned means and the second actuating the second means.

18. The combination, with means on a vehicle for releasing air, means for shutting off such release, and pairs of members located along the trackway for actuating the two mechanisms mentioned, the members of each pair being adjacent to each other and the one first encountered actuating the first mentioned means and the second actuating the second means, the first mentioned member being a stationary ramp and the second a device movable into and out of active position.

19. The combination, with means on a vehicle for releasing air, means for shutting off such release, and pairs of members located along the trackway for actuating the two mechanisms mentioned, the members of each pair being adjacent to each other and the one first encountered being a stationary ramp actuating the first mentioned means and the second being a rock arm movable into and out of the active position.

20. The combination, with two means on a vehicle, one adapted to initiate a danger indication and the other to counteract such initiation, and pairs of members located at intervals along the trackway for actuating said means respectively, the member actuating the initiation means being in advance of the member actuating the counteracting means.

21. The combination, with two means on a vehicle, one adapted to initiate the application of a brake and the other to counteract such initiation, and pairs of members located at intervals along the trackway for actuating said means respectively, the member actuating the initiating means consisting of a stationary ramp acting in advance of the member actuating the counteracting means, the latter member being a movable device normally out of active position but movable into active position.

22. The combination, with a vehicle having controlling means and initiating and counteracting means therefor, of a stationary ramp for operating the initiating means, and a movable rock shaft with a rock arm thereon for actuating the counteracting means.

23. The combination, with controlling means and initiating and counteracting mechanism therefor on a vehicle, of a ramp for operating the initiating means, and mechanism for operating the counteracting means comprising a rock shaft, a rock arm thereon, and a bar having at one end a knuckle joint with the rock arm and suitably held near its other end.

24. The combination, with controlling means on a vehicle, initiating and counteracting mechanism therefor on the vehicle, of a stationary ramp for operating the initiating means, and adjacent mechanism for operating the counteracting means comprising a rock shaft, a rock arm thereon, a bar having at one end a knuckle joint with the rock arm, and a guide for the bar near its other end.

25. The combination, with a vehicle having a pair of movable operating members and means whereby one is adapted to initiate a danger indication and the other to prevent such initiation being effective, of a pair of adjacent ramps adapted to engage and operate the same respectively, one of said ramps being movable.

26. The combination, with a vehicle having a pair of movable operating members and means whereby one is adapted to initiate the application of a brake and the other to prevent such initiation being effective, of ramps adapted to engage and operate the same respectively, said ramps being located in pairs at intervals along the path of travel, one ramp standing normally in active position and the other comprising an arm on a movable rock shaft.

27. The combination, with mechanism mounted on a movable vehicle and having a pair of movable operating members laterally offset from each other, means whereby one is adapted to initiate a danger indication and the other to counteract such initiation, and a pair of operating ramps along the trackway correspondingly out of longitudinal alinement, one ramp being normally stationary and in active position and the other movable into and out of active position.

28. The combination, with controlling mechanism mounted on a movable vehicle and having a pair of movable operating members laterally offset from each other, means whereby one is adapted to initiate the application of a brake and the other to prevent such application, and a pair of operating ramps along the trackway correspondingly out of longitudinal alinement, one ramp being stationary in active position and the other movable into and out of active position.

29. The combination with means on a vehicle for actuating a controlling agency and means for preventing such actuation taking effect, of means along the trackway for operating each of the vehicle means including a controllable track fixture adapted to be moved into position to engage and operate the preventing means.

30. The combination, with a pair of levers out of longitudinal alinement on a moving vehicle, mechanism controlled by one lever for initiating a danger indication, mechanism controlled by the other lever for counteracting such initiation, and ramps located in pairs at intervals along the trackway and adapted to engage and operate such levers.

31. The combination, with a pair of levers out of longitudinal alinement on a moving vehicle, mechanism controlled by one lever for initiating a danger indication, mechanism controlled by the other lever for counteracting such initiation, and ramps located in pairs at intervals along the trackway and adapted to engage and operate such levers, said ramps being out of longitudinal alinement and the ramp engaging the first mentioned lever being stationary and always in active position and that engaging the second mentioned lever being movable into and out of active position.

32. The combination, with a pair of raisable levers out of longitudinal alinement on a moving vehicle, an air valve, mechanism controlled by one lever for opening the air valve, mechanism controlled by the other lever for closing such valve, and ramps located in pairs at intervals along the trackway and adapted to engage and operate such levers, said ramps being out of longitudinal alinement and the ramp engaging the first mentioned lever being stationary and that engaging the second mentioned lever being movable, the stationary ramp being located parallel with the rail and having its top surface inclining upwardly from opposite directions, and the movable ramp being normally below the path of its lever but raisable into such path.

33. The combination, with a pair of raisable levers out of longitudinal alinement on a moving vehicle, mechanism controlled by one lever for initiating a danger indication, mechanism controlled by the other lever for counteracting such initiation, and ramps located in pairs at intervals along the trackway and adapted to engage and operate such levers respectively, said ramps being out of longitudinal alinement and the ramp engaging the first mentioned lever being stationary with an upward hump, and that engaging the second mentioned lever comprising a rock arm and a connected bar located parallel with the rail and adapted to have their joint swung upwardly to provide an intermediate hump or swung downwardly to be out of the path of the corresponding lever.

34. The combination, with a movable vehicle and two mechanisms thereon, one of which is adapted to initiate the application of a brake and the other of which is adapted to prevent such initiation being effective, of a stationary ramp, and an adjacent movable ramp out of alinement therewith both longitudinally and laterally, whereby said ramps may coöperate in rapid succession with said two mechanisms.

35. The combination, with a moving vehicle, of means thereon for giving a danger indication, means for counteracting such indication, and a pair of operating members for the respective means along the trackway adjacent to each other and out of longitudinal alinement.

36. The combination, with a vehicle, of mechanism thereon for applying a brake, mechanism thereon for preventing such application, each of said mechanisms having an operating lever, and ramps along the trackway adapted to be engaged respectively by said levers.

37. The combination, with a vehicle, means thereon for applying a brake, means for counteracting such application before the brake is applied, each of said means including a raisable operating lever, said two levers being located beside each other and out of longitudinal alinement, and respective ramps along the trackway adapted to engage said levers.

38. The combination of a vehicle having thereon an air valve, mechanism for releasing the same, mechanism for resetting the valve, said two mechanisms each including an operating member, which members are located out of longitudinal alinement, and operating devices along the trackway adapted to engage said operating members.

39. The combination, with means on a vehicle for applying a brake, means on the vehicle for preventing such application, and means along the trackway for controlling such preventing means and adapted to be moved into the path thereof.

40. The combination with means on a vehicle for operating a controlling agency and means for preventing such actuation taking effect, of means along the trackway for invariably operating the controlling agency, and a controllable track fixture adapted to be moved into position to engage and operate the preventing means.

41. The combination, with means on a vehicle for initiating a danger indication, means on the vehicle for counteracting such initiation before it becomes effective, and mechanism located along the path of travel and adapted when in active position to actuate the counteracting means, said mechanism tending to return by gravity to inoperative position.

42. The combination, with means on a vehicle for initiating a danger indication, means on the vehicle for preventing such initiation becoming effective, and mechanism located at intervals along the trackway and adapted when in active position to actuate the preventing means, said mechanism being normally in inoperative position and tending to return by gravity to inoperative position.

43. The combination, with means on a vehicle for applying a brake, means on the vehicle for preventing such application, and means along the trackway for controlling such preventing means, said last mentioned means being movable into active position and tending to return by gravity to inactive position.

44. The combination, with means on a vehicle for applying a brake, means on the vehicle for preventing such application, and stationary and movable means along the trackway for controlling such applying and preventing means respectively, said movable means being movable into active position and tending to return by gravity to inactive position.

45. The combination, with means on a vehicle for actuating a controlling agency, means on the vehicle for preventing such actuation taking effect, a movable bar along the path of travel for engaging such preventing means, and means for moving said bar into active position, the bar tending to return by gravity to inactive position.

46. The combination, with means on a vehicle for actuating a brake, means on the vehicle for preventing such actuation, a movable rock arm along the path of travel for engaging such preventing means, a rock shaft for raising said bar into active position, the bar tending to drop by gravity to inactive position.

47. The combination, with means on a moving vehicle for actuating a brake and means on the vehicle for preventing such actuation, of a stationary ramp along the trackway always in active position and adapted to engage one of said means on the vehicle, an adjacent ramp movable into active position and tending to return to inactive position and adapted to engage the other of said means on the vehicle, and electromagnetic mechanism for holding such movable ramp in active position.

48. The combination of a stationary ramp always in active position, an adjacent ramp movable into or out of active position, electro-magnetic mechanism for causing such movement, means on a moving vehicle for giving an indication, and means on the vehicle for counteracting such indication, each of said means being adapted to be operated by a different one of said ramps.

49. The combination, with means on a moving vehicle for giving an indication and means on the vehicle for counteracting such indication, of a stationary ramp adapted to actuate one of said means, an adjacent movable ramp adapted to actuate the other of said means, a rock shaft for operating the movable ramp, an arm on the rock shaft, and an electro-magnetic mechanism for operating said arm.

50. The combination, with means on a moving vehicle for actuating a brake and means on the vehicle for preventing such actuation, of a stationary ramp adapted to operate one of said means, a movable ramp adjacent thereto adapted to engage the other of said means, a rock shaft for operating the movable ramp, an arm on the rock-shaft, electro-magnetic mechanism for operating said arm, and an electro-magnetic latch for holding the movable ramp in active position.

51. The combination, with controlling means and initiating and counteracting means therefor on a vehicle, of means along the trackway for operating both of said means, and electromagetic mechanism for holding the means which operates the counteracting means in active position against some force tending to bring it to inactive position.

52. The combination, with controlling means and initiating and counteracting mechanisms therefor on a vehicle, of means along the trackway for operating the counteracting mechanism, said means being normally in idle position, an electric motor, and mechanism operated thereby for moving said means into active position.

53. The combination, with means on a vehicle for initiating a danger indication, and means on the vehicle for counteracting such initiation, of a movable device along the trackway for operating the counteracting means, said movable device being normally in idle position and tending to return to such position, mechanism for moving it to active position, and an electromagnetic latch for holding it in such position.

54. The combination, with means on a moving vehicle for actuating a controlling agency and means on the vehicle for preventing such actuation taking effect, of a stationary ramp in active position, an adjacent movable ramp, each of said ramps being adapted to operate one of said means on the vehicle, and an electric motor for moving the movable ramp into active position.

55. The combination, with means on a moving vehicle for initiating an indication and means for counteracting such initiation, of a stationary ramp, an adjacent movable ramp, each of said ramps being adapted to be engaged by one of said means on the vehicle, an electric motor for moving the movable ramp into active position, and an electromagnetic latch for holding it in active position.

56. The combination, with means on a moving vehicle for giving an indication and means for counteracting said indication, of a stationary ramp for operating one of said means an adjacent movable ramp for operating the other of said means on the vehicle, an electric motor for moving the movable ramp into active position, and an electro-magnetic latch for holding it in active position, the motor mechanism and the movable ramp tending to return by gravity to the idle position when released by the electro-magnetic latch.

57. The combination, with controlling means and initiating and counteracting means therefor on a vehicle, of a stationary ramp, an adjacent movable ramp at the side of the stationary ramp, said ramp being adapted to be engaged by the means on the vehicle, and said movable ramp being normally in idle position, and electro-magnetic means for holding it in active position.

58. The combination, with a stationary ramp, of a movable ramp at the side of the stationary ramp, a pair of raisable members on a vehicle adapted to initiate and counteract the initiation of a danger signal, each adapted to engage and be operated by the top surfaces of one of said ramps, and a motor adapted to raise the movable ramp into active position, said ramp tending to return by gravity to idle position.

59. The combination, with a stationary ramp, of a movable ramp at the side of the stationary ramp, a pair of raisable members on a vehicle for initiating and counteracting a danger indication, each adapted to engage and be operated by the top surface of one of said ramps respectively, a rock shaft for operating the movable ramp, an arm on the rock shaft, a motor, mechanism whereby the motor may engage and raise said arm, and an electro-magnetic latch for holding the arm in the raised position.

60. The combination, with controlling means and initiating and counteracting means therefor on a vehicle, of a stationary ramp adapted to engage one of said last mentioned means, a movable ramp adjacent thereto adapted to engage the other of said last mentioned means, a rock shaft for operating the movable ramp, an arm on the rock shaft, and operating mechanism adapted to give a blow to said arm.

61. The combination, with a moving vehicle having a movable operating member thereon, of a movable ramp for engaging the same comprising a rock shaft, an arm on the rock shaft, a bar hinged to said arm, and operating mechanism for said movable ramp comprising an arm on the rock shaft, and means for delivering a blow to said arm.

62. The combination of a movable ramp located along the trackway, a rock shaft and rock arm for moving the movable ramp, a motor, mechanism controlled thereby and including an arm adapted to be raised by the motor, and a loose connection between such arm and the arm first mentioned whereby the raising of the motor arm may give a blow to the ramp arm.

63. The combination, with controlling means and initiating and counteracting mechanism therefor on a vehicle, of a ramp, an adjacent ramp normally in idle position, mechanism for moving the latter ramp into active position, and a motor for driving such mechanism, and means for delivering a blow to such mechanism in such movement.

64. The combination, with means on a vehicle for initiating a danger indication and means on the vehicle for counteracting such initiation, of a ramp for engaging the initiating means always in active position, an adjacent counteracting ramp normally in idle position, a motor, mechanism raised thereby for moving the latter ramp into position, and means whereby said mechanism is given a blow in either direction of movement.

65. The combination, with controlling means and initiating and counteracting mechanism therefor on a vehicle, of a stationary ramp having a comparatively long and narrow web with an inclined top face adapted to engage one of said means on the vehicle, an adjacent movable ramp consisting of a pair of narrow hinged bars adapted to engage the other of said means on the vehicle, and a rock arm on which one of the bars is mounted, an operating arm on the rock arm, and motor mechanism adapted to deliver a blow to the operating arm.

66. The combination, with means on a vehicle for initiating the application of a danger indication, externally controllable means for variably counteracting such indication on forward movement of the vehicle, and automatic means for invariably counteracting such indication on the backward movement of the vehicle.

67. The combination, with means on a vehicle for initiating the application of a danger indication, controllable means for counteracting the same on forward movement, and automatic means for counteracting such indication on the backward movement of the vehicle.

68. The combination, with means on a vehicle and coacting means on the trackway for initiating a danger application, of means on the vehicle and means along the trackway adapted to be moved into position to counteract such application for forward movement of the vehicle, and means on the vehicle for counteracting such application when the vehicle moves in the reverse direction.

69. The combination, with a vehicle, of means thereon for initiating the application of a danger indication, two means for counteracting such initiation, a ramp for engaging the initiating means for either direction of movement of the vehicle, and movable mechanism adapted to engage one of the counteracting means on the forward movement of the vehicle, one of the second named means engaging the other counteracting mechanism on the rearward movement.

70. The combination, with means on the vehicle for initiating a danger indication, means on the vehicle for counteracting such initiation, a stationary ramp having a double inclined surface adapted to be engaged by both of said mechanisms, the counteracting mechanism being in advance of the applying mechanism, whereby the action of said counteracting mechanism is idle on the forward movement and effective on the reverse movement.

71. The combination, with a vehicle, of means thereon for initiating the application of a brake, two means on the vehicle for counteracting such initiation before it becomes effective, and operating devices located at intervals along the trackway and comprising means for invariably operating the initiating mechanism for either direction of movement of the vehicle and for invariably operating one of the counteracting means on reverse movement and means for operating or not the other counteracting means according to conditions.

72. The combination, with a vehicle, of means thereon for initiating the application of a brake, of two means for counteracting such initiation, a stationary ramp for engaging the initiating means for either direction of movement of the vehicle, movable mechanism adapted to engage one of the counteracting means on the forward movement of the vehicle, the stationary ramp engaging the other counteracting mechanism on the rearward movement.

73. The combination, with means on the vehicle for initiating a brake application, means for variably counteracting such initiation on forward movement, and means invariably counteracting the same on rearward movement.

74. The combination, with mechanism for initiating a danger indication, automatic means for resetting such mechanism before the indication is given, and a speed governor controlling the application of the resetting mechanism.

75. The combination, with means on a vehicle for initiating the application of a danger indication, members along the trackway for operating said means, a counteracting device on the vehicle, and a governor for such counteracting device causing it to operate automatically on slow speeds.

76. The combination, with means on a vehicle for initiating the application of a danger indication and means for counteracting the initiating of such indication, of a member along the trackway for operating the initiating means, a movable ramp adjacent thereto for counteracting such initiation, and a governor on the vehicle connected with such counter-acting means causing it to operate automatically on slow speed.

77. The combination, with means for applying a brake, means for resetting such means before the brake is applied, and a speed governor automatically controlling the application of the resetting mechanism.

78. The combination of an air valve on a vehicle, mechanism for opening the same, mechanism for closing the same, and means along the trackway for operating each of said means, a governor connected with the opening and closing mechanism and adapted to cause the closing mechanism to operate when the opening is accomplished by a speed of the vehicle less than a predetermined amount.

79. The combination, with mechanism on a vehicle for applying a brake and mechanism for preventing such application becoming effective, of ramps located along the trackway for controlling each of said mechanisms, and means on the vehicle operated by means along the trackway for automatically preventing a brake application when the speed is less than a predetermined amount.

80. The combination, with a vehicle having thereon brake applying means and resetting means therefor, said resetting means adapted to counteract the brake applying means, of controllers located in pairs at intervals along the trackway and comprising for each pair a stationary ramp adapted to operate the brake applying mechanism and a movable ramp adapted to operate the resetting mechanism, and means connected to the brake applying and resetting means adapted to be operated by the stationary ramp to automatically reset the mechanism when the speed is less than a predetermined amount.

81. The combination, with means on a vehicle for actuating a controlling agency and means for preventing such actuation taking effect, of means located along the trackway adapted to coact with each of said means on the vehicle for operating them, and a speed governor connected with each of the means on the vehicle for determining whether the preventing mechanism is operated or not, said governor retaining its equilibrium by inertia opposed to a spring.

82. The combination, with means on a vehicle for operating a controlling agency and means for preventing such operation, of operating mechanism located along the trackway and adapted to actuate said means, a speed governor connected with the means on the vehicle, said governor having a movable part connected with the preventing mechanism, and a yieldingly connected driver for said part, whereby the governor determines whether the track actuation is effective.

83. The combination, with mechanism on a vehicle for applying a brake, a member along the trackway for operating said mechanism, means on the vehicle for resetting such brake application before it becomes effective, and a connection between said means and the brake applying mechanism including a governor with a weight and an opposing spring.

84. The combination with an air valve on a vehicle, of means for opening said valve, a ramp along the trackway for operating said opening means, means preventing the operation of said ramp from effectively opening the valve, and a ramp for operating said last named means.

85. The combination, with mechanism for giving a danger indication, mechanism for counteracting such indication, a toggle joint between such mechanisms, and a spring restraining the movement of the members of the toggle.

86. The combination of an air valve, a lever and mechanism for opening the same, a lever and mechanism for resetting the valve, a toggle joint connecting said two levers, and a spring acting on the toggle.

87. The combination, with an operating device along the trackway, of indicating mechanism on a vehicle including an operating member, a second member for resetting said mechanism, and a toggle joint between said members, a spring acting on the knuckle of the toggle, whereby for high speeds the toggle buckles and the second member is not moved and for slow speeds the second member is moved, and means whereby said second member controls the effective indication.

88. The combination of an air valve, an operating device for opening the valve, mechanism for resetting the valve, a toggle joint having its links connected respectively to said device and said mechanism, and a spring acting on the toggle.

89. The combination, with mechanism for controlling an indication, operating mechanism therefor, a toggle joint between such mechanisms, and a spring restraining the movement of the members of the toggle.

90. The combination of a mechanism controlling the indication and having an arm with an adjustably positioned weight, a toggle joint having one link connected with said arm, an adjustable spring acting on the toggle, and a member adapted to move the other link of the toggle.

91. The combination, with means on a vehicle for applying a brake and means on the vehicle for preventing an application of the brake, of means along the trackway for actuating both of said vehicle means including a controllable track fixture adapted to be moved into position to engage and operate said preventing means.

92. The combination of a vehicle equipped with brake applying means, means for counteracting the application, track devices located at intervals and adapted when passed to always operate the first means and operate the second means or not according to conditions, and a signal on the vehicle operated by the operation of the first means.

93. The combination, with means on a vehicle for applying a brake and means on a vehicle for preventing the application of the brake, of means along the trackway for applying the brake and for preventing its application including a normally inactive controllable track fixture adapted to be moved into active position to engage and operate the mechanism for preventing the application of the brake.

94. The combination of a vehicle equipped with means for applying an air brake and means for preventing such application, pairs of track devices located at intervals, one of the members of each pair adapted to invariably operate the brake-applying means and the other member of each pair adapted to operate the operation means or not, according to track conditions, and an air signal on the vehicle operated by the brake-applying means.

95. The combination, with brake-applying means on a vehicle, of means for resetting said brake-applying means before it becomes effective, track devices adapted to actuate the brake-applying means and resetting means in quick succession, and a signal operated whenever the brake-applying means is actuated, said signal giving a different indication when the means is effective and when it is counteracted.

96. The combination, with a vehicle, of a casing carried thereby and having an open bottom and a longitudinal partition, brake applying mechanism between the partition and one wall of the casing, and resetting mechanism for the applying mechanism located between the partition and the other wall of the casing.

97. The combination, with a vehicle, of a casing carried thereby and having an open bottom and a longitudinal partition, brake applying mechanism between the partition and one wall of the casing, resetting mechanism for the applying mechanism located between the partition and the other wall of the casing, each of said mechanisms having an operating lever accessible from below, and operating devices located at intervals along the trackway and adapted to engage said levers respectively.

98. The combination, with brake-applying mechanism located on a vehicle and normally under constraint, of a stationary ramp along the trackway adapted to be engaged and operate the brake-applying mechanism, a movable ramp along the trackway, and movable resetting mechanism on the vehicle adapted to be operated by the ramp.

99. The combination of a brake-applying valve on a vehicle, mechanism for holding the same closed comprising a train of members, the removal of any one of which insures the application of the brake, a stationary ramp for invariably actuating said mechanism, a movable ramp, and movable mechanism operated by the movable ramp for resetting the valve.

100. The combination, with a controlling means on a movable vehicle, initiating and counteracting mechanism therefor, of a stationary ramp comprising a comparatively long and narrow web with an inclined top face, an adjacent movable ramp comprising a pair of bars in longitudinal alinement having a knuckle joint and located substantially parallel with the stationary ramp, said ramps being adapted to actuate said mechanism on the vehicle.

101. The combination, with controlling means on a movable vehicle, initiating and counteracting mechanism therefor, of a stationary ramp comprising a comparatively long narrow web with an inclined top face and projecting foot plates, an adjacent movable ramp comprising a pair of hinged bars located substantially parallel with the stationary ramp, said ramps being adapted to operate the initiating and counteracting mechanism on the vehicle.

102. The combination, with controlling means on a movable vehicle, initiating and counteracting mechanism therefor, of a stationary ramp coacting with one of said mechanisms, an adjacent movable ramp coacting with the other of said mechanisms and comprising a pair of bars in longitudinal alinement having a knuckle joint and located substantially parallel with the stationary ramp, a rock shaft, one of said bars being a rock arm on said rock shaft and the other bar being slidably guided at its other end.

103. The combination, with controlling means on a vehicle and initiating and counteracting mechanism therefor, of a stationary ramp coacting with the initiating mechanism comprising a comparatively long narrow upright web with an inclined top face and projecting feet, an adjacent movable ramp coacting with the counteracting mechanism comprising a pair of narrow bars in longitudinal alinement having a knuckle joint and located substantially parallel with the stationary ramp, and a horizontal rock shaft at right angles to the stationary ramp, one of said bars being a rock arm on said rock shaft and the other bar being slidably guided at its other end on a bracket connected with the stationary ramp.

104. In a system of the class described, a train carried apparatus including an air valve, means holding said valve closed, a device for releasing said holding means to permit said valve to open, means for resetting said holding means and thereby reclosing said valve, a tripping ramp for actuating said releasing device, and a controlled track fixture for operating said resetting mechanism.

105. In a system of the class described, an apparatus including an air valve, means holding said valve closed, means latching said holding means from accidental displacement, means for releasing said holding means and said latching means to permit said valve to open, and means including a track fixture for resetting the aforesaid parts.

106. The combination, with means on a vehicle for applying a brake and means on the vehicle for preventing the application of the brake, of two adjacent ramps along the trackway each adapted to actuate one of said vehicle means respectively.

107. The combination, with means on a vehicle for giving a danger indication, controllable means for preventing such danger indication on the forward movement, and automatic means for invariably preventing such indication on the backward movement of the vehicle.

108. In a system of the class described, a train carried apparatus including an air valve, means holding said valve closed, a device for releasing said holding means to permit said valve to open, means for resetting said holding means and thereby reclosing said valve, combined with a tripping ramp for operating said releasing device, and a controlled track fixture for normally acting on said resetting mechanism to reset said holding means and thereby again close said valve.

109. In a system of the class described, a train carried apparatus including an air valve, means holding said valve closed, a device for releasing said holding means to permit said valve to open, means for resetting said holding means and thereby reclosing said valve, combined with a tripping ramp arranged along the right of way for engagement by said releasing device, and a controlled track fixture for normally acting on said resetting mechanism to restore said holding means and thereby again close said air valve.

110. The combination with a train carried air brake actuating apparatus including an air brake setting valve, means for holding said valve closed, means for releasing said holding means, means for resetting said valve holding means; of a track ramp for operating said releasing means, and a controlled track fixture for operating said resetting means.

111. A train carried apparatus that includes a valve connectible to the train pipe of an air brake system, means for holding said valve normally closed, means for releasing said holding means, and a resetting means for resetting the same, and a track device for operating said resetting mechanism.

In testimony whereof. I hereunto affix my signature in the presence of two witnesses.

ELMER M. JONES.

Witnesses:
B. F. MARKERT,
R. C. PATTERSON.